United States Patent [19]

Roudavitch

[11] Patent Number: 5,291,793
[45] Date of Patent: Mar. 8, 1994

[54] DYNAMOMETER LINK

[75] Inventor: Georges Roudavitch, Chatellerault, France

[73] Assignee: Sextant Avionique, Meudon la Foret, France

[21] Appl. No.: 904,727

[22] Filed: Jun. 26, 1992

[30] Foreign Application Priority Data

Jun. 27, 1991 [FR] France ............... 91 07950

[51] Int. Cl.$^5$ .................................... G01L 1/00
[52] U.S. Cl. ...................... 73/862.53; 73/862.392
[58] Field of Search ................ 340/665, 666, 668; 200/25 R, 56 R, 52 R, 81.4, 82 C; 73/862.392, 862.53, 862.541

[56] References Cited

U.S. PATENT DOCUMENTS

| | | | |
|---|---|---|---|
| 4,552,999 | 11/1985 | Aunas | 200/82 C |
| 4,724,289 | 2/1988 | Heissler | 200/82 C |
| 4,924,043 | 5/1990 | Aubrey et al. | 200/52 R |

FOREIGN PATENT DOCUMENTS 0006051 12/1979 European Pat. Off. .
0313470 10/1988 European Pat. Off. .
1049151 11/1966 United Kingdom .

Primary Examiner—Richard E. Chilcot, Jr.
Assistant Examiner—R. Biegel
Attorney, Agent, or Firm—Browdy and Neimark

[57] ABSTRACT

A dynamometer link comprises a first transmission member adapted to slide axially relative to a second transmission member with spring means disposed between the first and second transmission members. Relative displacement of the two members is amplified by a lever pivotally mounted on one of the two members and on which the other member operates. The lever comprises at least a radial arm articulated to one of the members and comprising at a distance from the articulation a two-way axial coupling to the other member and an axial arm having a free end on respective sides of which are disposed two detector members. The link is able to determine the direction of the force transmitted by the link.

9 Claims, 2 Drawing Sheets

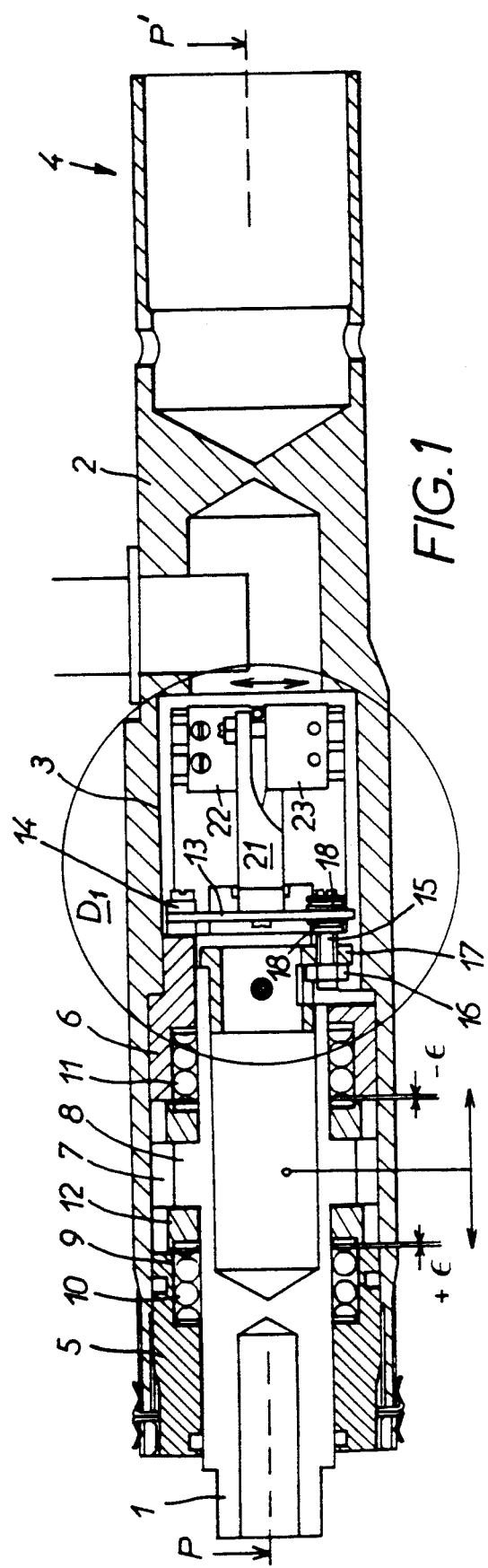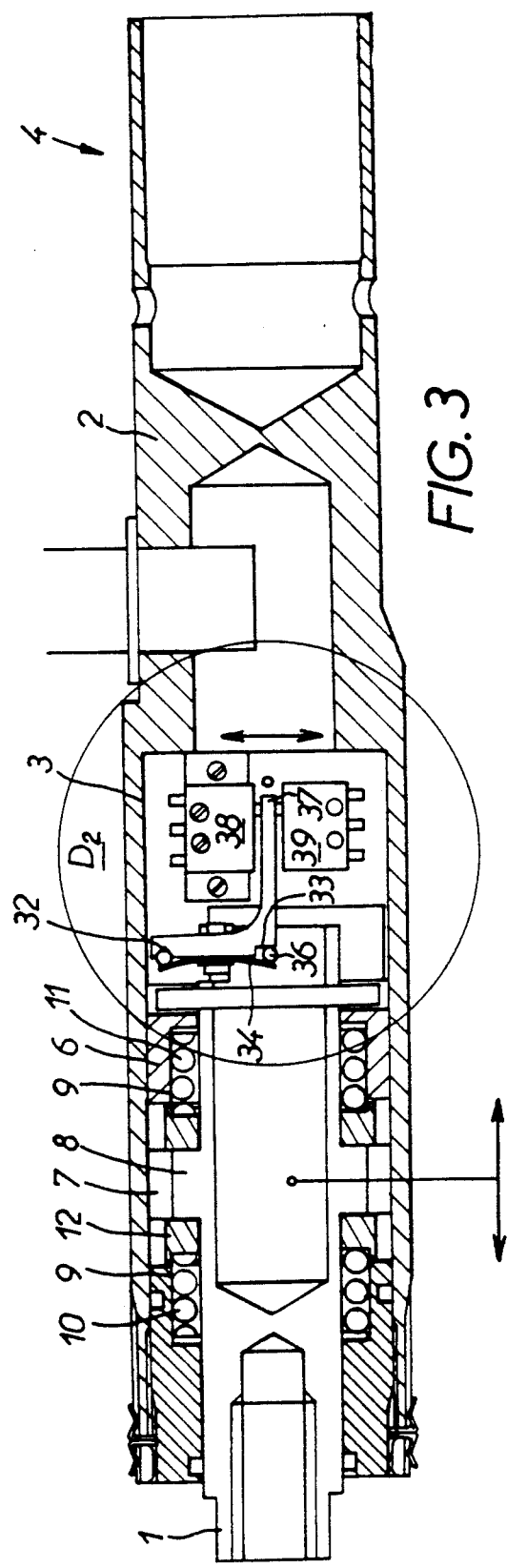

DYNAMOMETER LINK

BACKGROUND OF THE INVENTION

1. Field of the invention

The present invention concerns a dynamometer link, that is to say a link adapted to provide information relating to the magnitude of forces that it transmits along a longitudinal axis.

2. Description of the prior art

French patent 2 434 377 discloses a link of this kind comprising at least two male and female members disposed to slide axially one within the other and spring-loaded by respective spring means so that a force transmitted by the link causes a relative displacement representing said force. This relative movement is detected by a lever pivoting inside the female member one end of which cooperates with a cam carried by the male member and the other end of which is adapted to operate a microswitch when the relative displacement of the two members and therefore the pivoting of the lever exceeds a particular threshold.

Of course, to avoid any disturbance of the kinematic system in which the link is incorporated, the relative displacement of the two members must be as small as possible and must preferably lie outside the range of normal loads on the link.

To this end the prior art patent provides for:
prestressing the spring means so that relative displacement of the two members occurs only beyond a predetermined force threshold;
dimensioning the lever and disposing the microswitch so that the latter is operated only beyond a second force threshold higher than the first.

The solutions put forward in this prior art patent have two drawbacks.

The first is that the cam-abutment-lever system is relatively bulky and requires relatively high amplification of the relative movement detected and consequently a long lever. The female member of the link which contains this system must therefore be relatively long and bulky. The use of two levers, one of which carries the microswitch, makes it possible to reduce the length of this member by half. However, this reduction in the length is achieved at the cost of an increase in the diameter.

The second drawback is that this device cannot determine the direction of the force transmitted by the link. This information is relatively important because it makes it possible to distinguish a driving force from a force due to an external force applied to the load.

A particular object of the invention is to eliminate these drawbacks.

SUMMARY OF THE INVENTION

The present invention consists in a dynamometer link comprising a first transmission member adapted to slide axially relative to a second transmission member with spring means disposed between said first and second transmission members so as to be elastically deformed by any relative displacement of one member relative to the other from a rest position, relative displacement of said two members being amplified by a lever pivotally mounted on one of said two members and on which the other member operates, a force transmitted by said link being detected by at least one device for detecting the position of the free end of said lever which comprises at least two arms, namely a radial arm articulated to one of said members and comprising at a distance from the articulation means providing a two-way axial coupling to the other member and an axial arm having a free end on respective sides of which are disposed two members for detecting the position of said end, each detector member being assigned to a different direction of the force transmitted by the link.

Said detector members may advantageously be microswitches facing the axial arm so as to be operated only after a particular pivoting travel of the lever.

Embodiments of the invention will be described hereinafter by way of non-limiting example with reference to the appended drawings.

BRIEF DESCRIPTION OF THE DRAWINGS

FIG. 1 is a view in axial cross-section of a first embodiment of a link in accordance with the invention.

FIG. 3 is a view in axial cross-section of a second embodiment of a link in accordance with the invention.

DETAILED DESCRIPTION OF THE INVENTION

Figure 2:
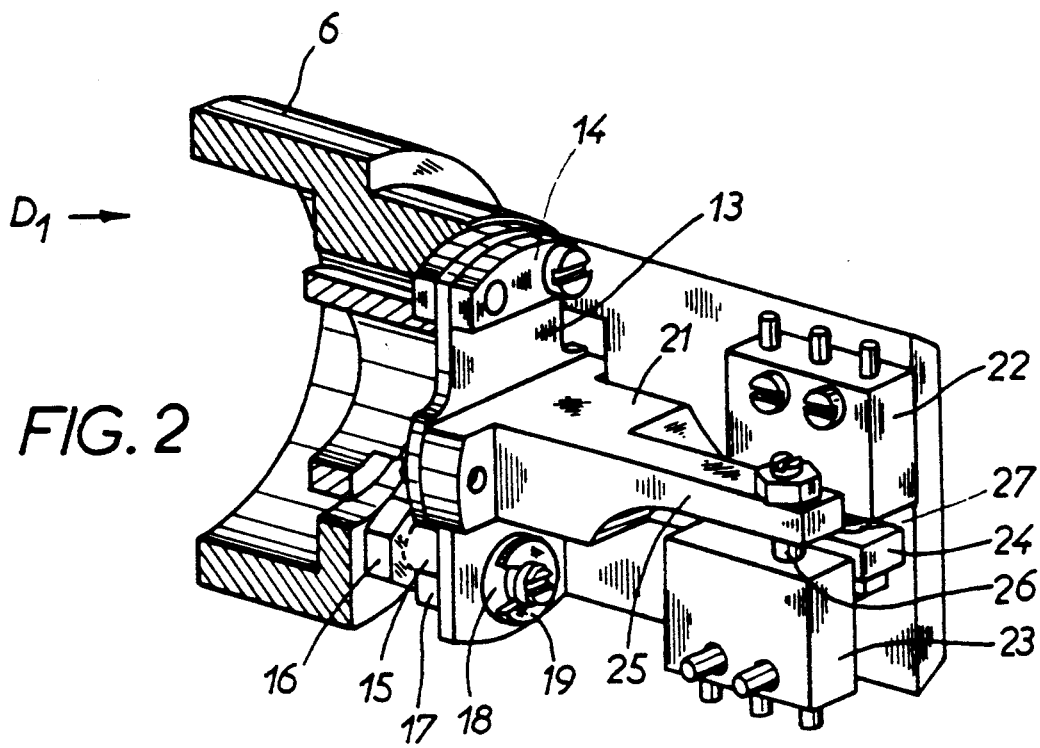
FIG. 2 is a cutaway perspective view to a larger scale of the detail of FIG. 1 indicated by the circle $D_1$.

In these examples, the dynamometer link comprises a male part in the form of a shouldered cylindrical rod 1 and a female part in the form of a part-tubular sleeve 2 comprising at one end a cylindrical bore 3 with different diameter portions in which the male part 1 slides and at the other end conventional fixing means 4.

The rod 1 is slidably mounted inside the bore 3 by means of two bearing bushes 5, 6 between which is an annular space 7 accommodating a shoulder 8 on the rod 1.

Each of the bushes 5, 6 has in the part adjoining the annular space 7 a recess 9 which delimits with the rod 1 an axial annular space accommodating a prestressed spring 10, 11 which bears on the shoulder 8 through a washer 12.

The two springs 10, 11 are identical and are identically prestressed so that when no force is applied to the link the shoulder 8 is at the center of the annular space 7 and can move to either side of this position over a particular distance $\pm E$ against the action of the springs 10, 11.

In the example shown in FIGS. 1 and 2 the device for detecting relative movement between the male and female parts of the link comprises a radial plate 13 made from an elastically deformable material fixed at one end 14 to the edge of the bearing bush 6. The other end of the plate 13 includes a bore through which passes an axial screw 15 whose end is screwed into a nut 16 fastened to a flange 17 on the rod 1.

The screw 15 is fastened to the plate 13 by spring washers 18 on either side of the plate 13, this assembly being secured axially by a shoulder on the rod 1 and a circlip 19 inserted into a groove in the head of the screw 15.

Rigidly fixed to the central part of the plate 13 is a lever arm 21 which extends axially inside the bore 3 and whose free end cooperates with two microswitches 22, 23 facing in opposite directions.

In this example, with a view to reducing the overall dimensions, the free end of the lever arm 21 comprises two axial portions 24, 25 offset relative to each other in a rotation plane perpendicular to the median plane of symmetry P, P' of the link and perpendicular to the rotation axis of the lever. Each of these portions has an adjustable abutment 26, 27 adapted to act on the actuator member of a respective microswitch 22, 23. Space is saved because offsetting the two arm portions 24, 25 allows slight overlapping of the two microswitches 22, 23 in a plane perpendicular to the plane P, P'.

The link as previously described operates in the following manner:

In the rest state in which no force is transmitted by the link, or if the link is transmitting a force below a first threshold value depending on the stiffness of the springs 10, 11 and the degree to which they are prestressed:

the shoulder 8 on the rod 1 is centered in the annular space 7, the rod 1 does not exert any force on the plate 13 which remains radial, the two portions 24, 25 of the lever arm 21 are parallel to the longitudinal plane of symmetry P, P' and do not act on the microswitches 22, 23.

If the force transmitted by the link in the rod 1/sleeve 2 direction becomes greater than the first threshold relative displacement occurs between the two parts 1 and 2 and the spring 11 is simultaneously compressed.

The free end of the plate 13 is displaced axially towards the free end of the sleeve 2. The plate deforms elastically about an axis near the end 14.

Because of this deformation the lever 21 tilts upwards entraining the arm portion 24 towards the actuator member of the microswitch 22.

If the force transmitted by the link exceeds a second threshold the value of which is set by the location of the adjustable abutment 27 the arm portion 24 operates the microswitch 22. The microswitch 22 and likewise the microswitch 23 may advantageously be connected to a monitoring and/or safety circuit adapted to exploit as necessary the information relating to the change of state of the microswitch.

By a similar process, if a force exerted in the sleeve 2/rod 1 direction exceeds the first threshold the plate 13 is displaced towards the rod 1 and deforms elastically to tilt the lever arm 21 downwards. If this force then exceeds the second threshold, the arm portion 25 operates the microswitch 23.

It is evident that the direction of the force transmitted by the link can be determined from which of the two microswitches 22, 23 is operated.

Of course, the two thresholds previously mentioned could be substantially coincident in a single threshold. In this case the adjustable abutments 26, 27 must be adjusted so as to engage with the actuator members of the microswitches 22, 23 near the switching threshold of the latter.

Figure 4:
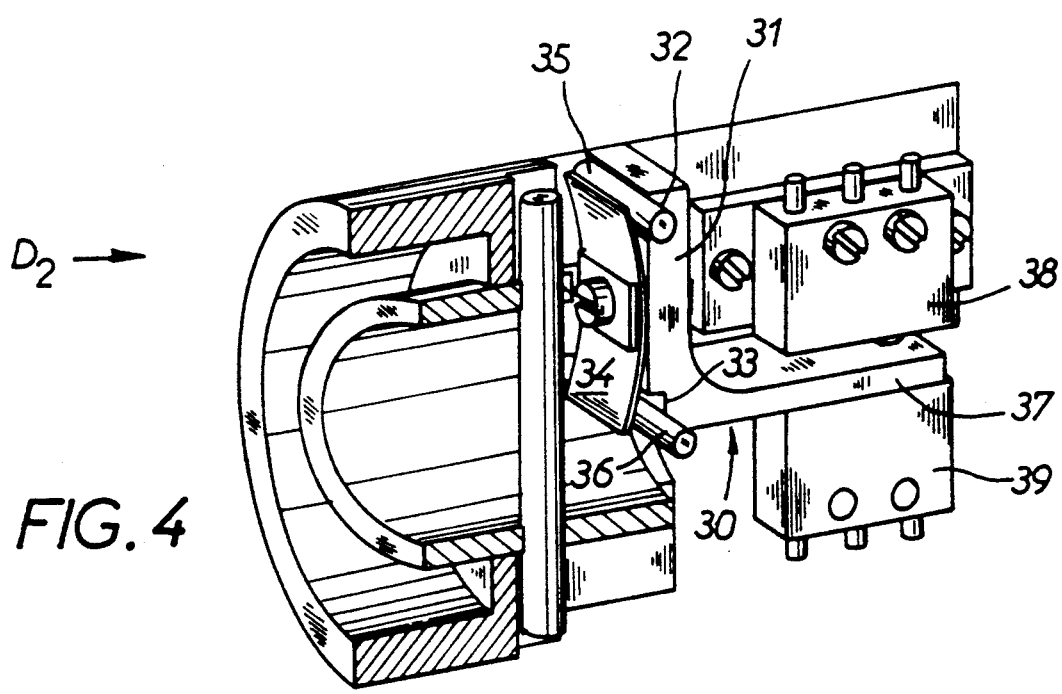
FIG. 4 is a cutaway perspective view to a larger scale of the detail of FIG. 3 indicated by the circle $D_2$.

The embodiment shown in FIGS. 3 and 4:
improves the accuracy of the dynamometer link, and increases (virtually doubles) the displacement multiplying factor provided by the lever.

In this example the assembly comprising the plate and the lever is replaced by a rigid cranked lever 30 in the shape of the letter L lying on its side. The length of the shorter branch 31 is substantially equal to the radius of the bore 3. On the outside surface of the shorter arm 31 are a V-shape notch 32 at the end adjacent the wall of the bore 3 and a rectangular notch 33 parallel to the first-mentioned notch at the other end.

A flexible tang 34 fixed at the center of the branch 31 holds the notch 32 against a pin 35 fastened to the sleeve 2 which constitutes the pivot pin of the lever 30.

The tang 34 likewise holds the notch 33 against a pin 36 parallel to the pin 35 but fastened to the rod 1.

The combination of the notches 32, 33/pins 35, 36/tang 34 provides a double linkage articulated to the sleeve 1 without play (pin 35/notch 32) and articulated to the rod 1 with radial play but no axial play (pin 36/notch 33).

In this example the pin 36 and the longer branch 37 of the lever 30 lie in the longitudinal plane of symmetry P, P' of the link. The two microswitches 38, 39 are on either side of the end of the branch 37 and therefore of the plane of symmetry P, P'.

This link operates in a similar way to that previously described.

By virtue of the action of the pin 36 on the notch 33, rotary rod 1/sleeve 2 displacement causes displacement of the end of the branch 31 of the lever 30 and consequently tilting upwards of the whole of the lever 30 about the pin 35. Beyond a particular force threshold this operates the microswitch 38.

By virtue of the action of the pin 36 on the tang 34, relative displacement of the sleeve 2/rod 1 causes rotation of the lever 30 in the opposite direction to operate the microswitch 39.

Given that the point at which the force exerted by the rod 1 on the lever 30 is much nearer the pivot pin 35 that in the previous example, the rotation angle for the same displacement will be larger (substantially doubled in this example). The displacement of the end of the lever 30 (arm 37) will therefore be twice the previous displacement for the same overall length.

It is therefore possible to reduce the length of the lever 30 and therefore the dimensions of the link but still obtain increased accuracy as compared with the embodiment previously described.

What is claimed is:

1. Dynamometer link for transmitting an axial tensile or compressive force, comprising:
   two transmission members adapted to slide axially relative to each other;
   spring means disposed between said transmission members so as to be elastically deformed by any relative displacement of one member relative to the other from a rest position, due to said forces;
   a lever comprising a radial arm coupled through hinge means to one of said two transmission members and maintained against the other of said two transmission members, and an axial arm having a free end, a relative displacement of said two transmission members driving said lever in rotation about a rotation axis and generating an amplified displacement of the free end of said lever; and
   two detector members disposed respectively close to two opposite sides of said free end in a plane perpendicular to said rotation axis, each detector member being assigned to detect a rotating motion of the free end of said axial arm in a respective direction corresponding to a direction of said force.

2. Dynamometer link according to claim 1 wherein said transmission members are of the male and female type and one slides inside the other and said radial arm is maintained against said female member and coupled to said male member.

3. Dynamometer link according to claim 1 wherein said detector members comprise microswitches disposed with respect to said radial arm so as to be operated only by virtue of tilting of said lever exceeding a particular degree of tilting.

4. Dynamometer link according to claim 1 wherein the free end of said lever carries adjustable abutments adapted to operate on actuator members of said microswitches.

5. Dynamometer link for transmitting an axial tensile or compressive force, comprising:

two transmission members adapted to slide axially relative to each other;

a lever comprising a radial arm formed by a radial plate made from an elastically deformable material fastened to one of said two transmission members and coupled to the other of said two transmission members, said radial arm having a central part to which is rigidly fixed an axial arm having a free end, a relative displacement of said two transmission members driving said lever in rotation about a rotation axis and generating an amplified displacement of the free end of said lever; and two detector members disposed respectively close to two opposite sides of said free end in a plane perpendicular to said rotation axis, each detector member being assigned to detect a rotating motion of the free end of said axial arm in a respective direction corresponding to a direction of said force.

6. Dynamometer link for transmitting an axial tensile or compressive force, comprising:

two transmission members adapted to slide axially relative to each other;

spring means disposed between said transmission members so as to be elastically deformed by any relative displacement of one member relative to the other from a rest position, due to said forces;

a lever comprising a radial arm coupled through hinge means to one of said two transmission members and maintained against the other of said two transmission members, and an axial arm having two axial portions offset relative to each other in a plane perpendicular to a rotation axis of said lever, a relative displacement of said two transmission members driving said lever in rotation about a rotation axis and generating an amplified displacement of the two axial portions of said lever; and two detector members disposed respectively close to said two axial portions in a plane perpendicular to said rotation axis, each detector member being assigned to detect a rotating motion of one respective of said two axial portions in a respective direction corresponding to a direction of said force.

7. Dynamometer link for transmitting an axial tensile or compressive force, comprising:

a male transmission member adapted to slide axially inside a female transmission member;

spring means disposed between said male and female transmission members so as to be elastically deformed by any relative displacement of one member relative to the other from a rest position, due to said forces;

a rigid L-shaped lever located inside the female member and comprising an axial arm having a free end and linked through a cranked portion to a radial arm having a free end coupled without play through hinge means to said female transmission member, said cranked portion being maintained with a slight radial play against the male transmission member, a relative displacement of said two transmission members driving said lever in rotation about a rotation axis and generating an amplified displacement of the free end of said axial arm; and two detector members disposed respectively close to two opposite sides of the free end of said axial arm in a plane perpendicular to said rotation axis, each detector member being assigned to detect a rotating motion of the free end of said axial arm in a respective direction corresponding to a direction of said force.

8. Dynamometer link according to claim 7 wherein the hinge means coupling the lever to said female member incorporates a V-shape notch held against a pin fastened to said female member by an elastic tang fastened to said lever.

9. Dynamometer link according to claim 7 wherein the hinge means coupling said lever to said male member incorporates a rectangular notch in said cranked portion held against a pin fastened to said male member by said elastic tang.

* * * * *